United States Patent [19]

Pearson

[11] Patent Number: 4,781,302

[45] Date of Patent: Nov. 1, 1988

[54] ARTICLE WITH A HANDLE AND A METHOD OF ATTACHING A HANDLE TO AN ARTICLE

[75] Inventor: Arthur Pearson, Halesowen, England

[73] Assignee: George Salter & Co. Limited, West Bromwich, England

[21] Appl. No.: 110,106

[22] Filed: Oct. 14, 1987

Related U.S. Application Data

[63] Continuation of Ser. No. 881,398, Jul. 2, 1986, abandoned.

[30] Foreign Application Priority Data

Jul. 3, 1985 [GB] United Kingdom ................ 8516846
Jul. 31, 1985 [GB] United Kingdom ................ 8519324

[51] Int. Cl.$^4$ ............................................. A47B 95/00
[52] U.S. Cl. ................................ 220/94 R; 16/110 A
[58] Field of Search ...................... 220/94 R, 94 A; 16/110 A

[56] References Cited

U.S. PATENT DOCUMENTS

| 1,482,765 | 2/1924 | Sanborn | 220/94 R |
| 2,758,748 | 8/1956 | Konefes | 220/94 R X |
| 3,323,677 | 6/1967 | Schraeger | 220/94 R |
| 4,008,822 | 2/1977 | Carroll | 220/94 R |
| 4,083,081 | 4/1978 | Witte | 220/94 R X |

FOREIGN PATENT DOCUMENTS 1123921 5/1955 France.

Primary Examiner—Steven M. Pollard
Attorney, Agent, or Firm—Becker & Becker, Inc.

[57] ABSTRACT

A handle is attached to a shaft on a saucepan body by a retaining plate. The plate is bowed and introduced into a slot on the underside of handle where it is retained in a pre-stressed condition prior to assembly. In other embodiments the plate may be flat with a bow being induced into the plate on assembly of same into the slot, or, alternatively, the plate may be flat both prior to and after assembly.

Additionally, other handles may be assembled to shafts on articles other than saucepans using the retaining plate.

6 Claims, 3 Drawing Sheets

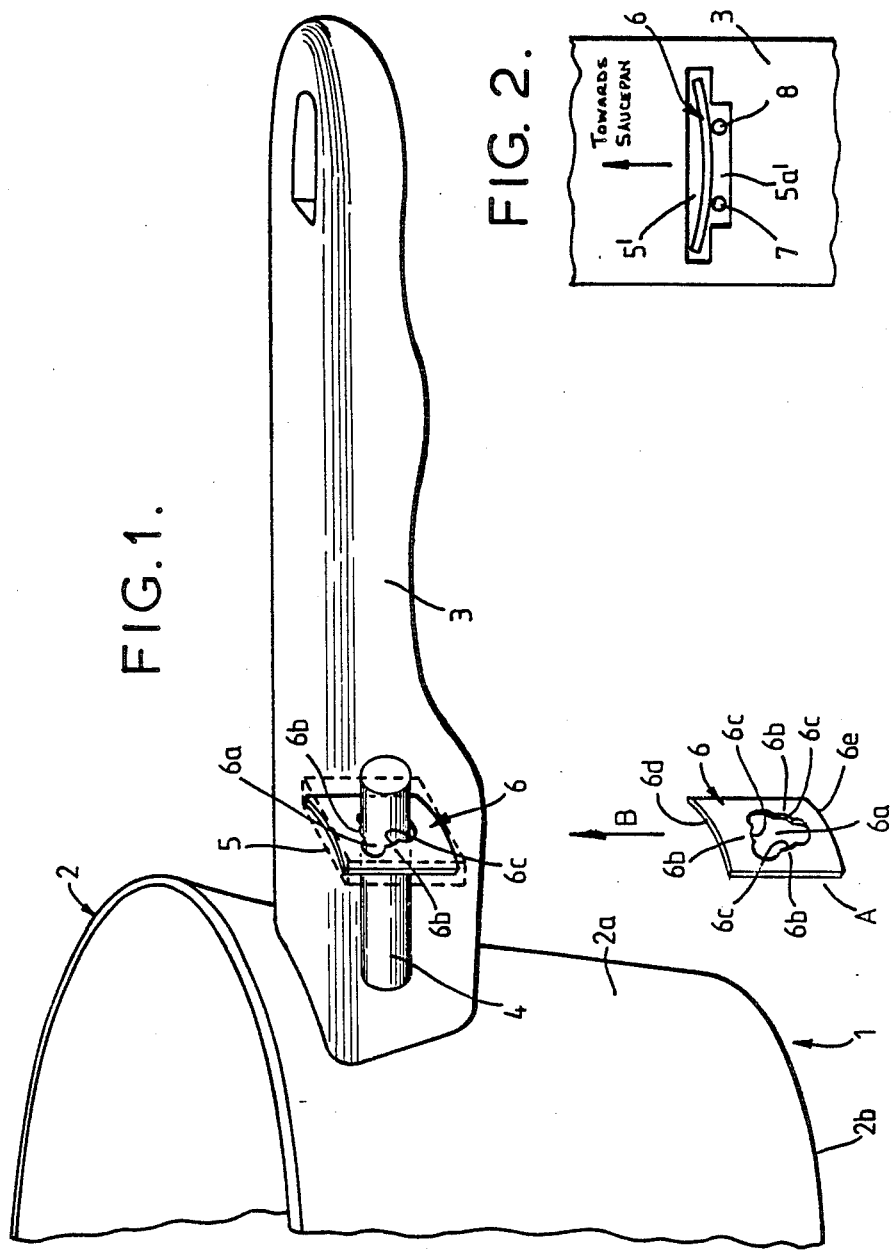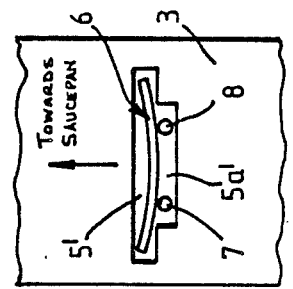

ARTICLE WITH A HANDLE AND A METHOD OF ATTACHING A HANDLE TO AN ARTICLE

This application is a continuation of copending application Ser. No. 881,398-Pearson filed July 2, 1986, now abandoned.

FIELD OF INVENTION

This invention relates to an article, particularly but not exclusively a saucepan or the like, having a handle, and also to a method of attaching a handle to an article.

BACKGROUND OF INVENTION

Many articles, and in particular household cooking utensils, require some form of handle and despite the fact that the problems involved in attaching a handle reliably to an article are well known, results, particularly with regard to cooking utensils, can often be far from satisfactory. For example, it is well known that saucepan handles can become loose in time and where a screw is provided for tightening the handle up on the saucepan this can still be quite ineffective for tightening the handle. Such handles usually remain attached to the saucepan if the screw is tightened up but are still able to rotate through a significant angle relative to the pan body; this can cause at the very least an irritating rattle and it is not inconceivable that such loose handles can be dangerous leading perhaps to the spillage of the hot contents. Additionally, once such a handle does become loose on the saucepan the screw tends to become loose again more rapidly tha before and more or less constant attention may be required to keep on tightening the screw so that the handle will still remain attached to the pan body without rotating through an intolerable angle. Yet again most people would probably tend to assume that if the screw were tightened up properly the handle would be tightened up correctly and such a misconception must surely be frustrating and could lead to the screw itself or pan being damaged by over tightening. Additionally, in some cases the screw itself can become stretched longitudinally through various temperature changes of the saucepan during use and this can only add to the problem of proper retention of the handle on the saucepan. Quite apart from the significant problems involved with regard to the manufacture of reliable saucepan handles there is also the matter of the costs involved and the relative case of production of articles requiring a handle and simplicity of design. It may be that some designs are disadvantageously becoming rather more expensive to manufacture and this may be due at least in part to the handle attachment arrangement. Additionally, further problems may be realized in the handle assembly where large tolerances are invariably involved.

It is an object of the present invention to alleviate one or more of the aforementioned problems.

SUMMARY OF INVENTION

According to the present invention there is provided an article, for example a saucepan, comprising a handle attached to a side wall of the article, said side wall being provided with a shaft, the handle having a recess receiving the shaft and having a slot receiving a retaining plate extending generally transversely of the shaft, said retaining plate having an aperture with gripping surfaces, for example provided by integral legs or teeth extending from the aperture towards the axis thereof, gripping the shaft thereby, the retaining plate having either been performed into a generally bowed shape prior to assembly of the handle on the shaft or stressed into a generally bowed shape during assembly.

Further according to the present invention there is provided a method of attaching a handle on an article, for example a saucepan, said method comprising:
(a) providing a shaft on the article, for example by welding the shaft onto a side wall of the article,
(b) providing a handle with a recess for receiving the shaft and with a slot extending generally at right angles to the recess, said slot receiving a bowed, apertured retaining plate in a pre-stressed condition,
(c) introducing the shaft into the recess and through the aperture in the retaining plate,
(d) deforming the retaining plate so that gripping surfaces, for example provided by legs or teeth projecting from said aperture, bite into the shaft to thereby retain the handle on the article, said bow of the plate being reduced or flattened out by said deforming action.

Further according to the present invention there is provided a method of attaching a handle on an article, for example a saucepan, said method comprising:
(a) providing a shaft on the article, for example by welding the shaft onto a side wall of the article,
(b) providing a handle with a recess for receiving the shaft and with a slot extending generally at right angles to the recess, said slot receiving a generally flat, apertured retaining plate in a pre-stressed condition,
(c) introducing the shaft into the recess and through the aperture in the retaining plate,
(d) deforming the retaining plate so that gripping surfaces, for example provided by legs or teeth projecting from said aperture, bite into the shaft to thereby retain the handle on the article, a bowed configuration being induced into the plate by said deforming action.

The article may be a saucepan or similar vessel with the preformed bowed plate having curved edges arranged in parallel vertical planes (i.e. in planes at right angles to the pan bottom) at least prior to assembly of the handle on the shaft. Alternatively, said curved edges may be arranged in parallel horizontal planes (i.e. in planes parallel to the pan bottom) at least prior to assembly of the handle and on the shaft.

Where a bow is induced into the plate of initially generally flat form, the plate may have curved edges arranged in parallel vertical planes (or alternatively in parallel horizontal planes) after assembly of the handle on the shaft.

The slot, preferably, opens from the underside (i.e. towards the plane containing the pan bottom) and the end of the slot opposed to the open end is, preferably, closed off.

The recess and/or slot is, preferably, moulded in the handle.

Conveniently, the shaft may extend in a direction parallel to the axis of the handle.

The retaining plate may be deformed by the required amount as the handle is introduced onto the shaft or may in some instances require a further deformation operation.

The slot may be stepped or provide access for a pronged or wedge tool (and/or possibly to receive legs or teeth of the plate) to stress the preformed bowed plate to a reduced bow or substantially flat condition in the finished assembly of article and handle; where the plate is originally of generally flat form—possibly formed with slight curved edges to retain it in the slot—the tool may stress the plate to a bowed form.

Usually, the shaft will be a threadless shaft.

Still further according to the present invention there is provided, a method of attaching a handle on an article, for example a saucepan, said method comprising:
(a) providing a shaft on the article,
(b) providing a handle with a recess for receiving the shaft and with a slot receiving an apertured receiving plate,
(c) introducing the shaft into the recess and through the aperture in the retaining plate, and
(d) deforming the plate so that the plate grips the shaft and thereby retains the handle on the article.

Still further according to the present invention there is provided an article when made by the method according to the immediately preceding paragraph. Preferably, the retaining plate is received as an interference fit in the slot or aperture and may be provided with external grip means such as legs or teeth.

BRIEF DESCRIPTION OF THE DRAWINGS

An embodiment of a saucepan with a handle and of a method of attaching the handle in accordance with the present invention will now be described, by way of example only, with reference to the accompanying schematic drawings in which:

FIG. 1 shows a much simplified partly cut away perspective view of the saucepan showing a handle assembly;

FIG. 2 shows a plan view of a slightly modified slot arrangement of the handle;

DESCRIPTION OF PREFERRED EMBODIMENT

Figure 3:
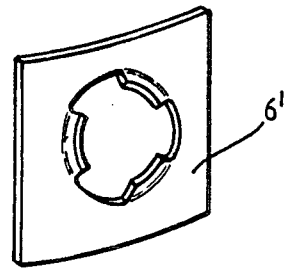
FIGS. 3 and 4 show possible alternative forms for a retaining plate of the handle assembly.

FIG. 1 shows schematically a saucepan 1 having a pan body 2 which has been cut away for ease of illustration. An elongate handle 3 projects from a side wall 2a of the pan body 2.

A metal shaft 4 of round section has been welded to the side wall 2 and extends therefrom into a matching recess in the handle 3, said recess in this instance is moulded into the handle 3 and extends parallel to the axis thereof. The cross section of the shaft 4 may be varied to suit requirement and could alternatively be, for example, square, rectangular or polygonal.

A downwardly open rectangular slot 5 is provided as shown in FIG. 1, and opens from the underside of the handle 3 towards the plane containing the pan bottom 2b. The top of the slot 5 is closed off by the material of the handle 3. The slot 5 is generally transverse of the shaft 4 and, in this instance, receives a bowed retaining plate 6. Retaining plate 6 is introduced into slot 5 from the underside of handle 3 in the directionof arrow B, prior to assembly of the handle on the pan body 2; the plate is retained in the slot by the inherent resilience of the plate so that the bowed plate is placed in a prestressed condition as it is introduced into the slot 5.

The plate 6 has an aperture 6a and, as more clearly illustrated in a position A (prior to being introduced into slot 5 in direction of arrow B) has three integral legs or teeth 6b providing arcuate gripping surfaces 6c to grip shaft 4 thereby. Once the plate 6 has been introduced into the slot 5 the shaft is introduced axially into the aperture 6a and the shaft forced through the aperture which thereby distorts the bow shape somewhat to securely retain the handle in the shaft and substantially eliminate any movement (including relative rotation) between the handle and saucepan. The handle 3 should remain securely attached for an indefinite period of time and should withstand the sort of treatment that a saucepan would be expected to receive during its useful life.

Where tolerances in the mating parts are quite large (due, for example, to variations in thickness of an enamel coating applied to the saucepan) the bowed plate may instead be axially rotated through 90° when in position A (before movement in direction of arrow B) so that the curved edges 6d and 6e are arranged in parallel vertical planes (in planes at right angles to the pan bottom 2b) rather than in parallel horizontal planes as illustrated. An increased interference between the closed off end of slot 5 and the upper surface of the shaft 4 is then also provided with the curved edges 6d and 6e arranged at right angles to the position as shown within the habdle 3. Owing to the end of the handle 3 which is shaped according to the contour of the side wall 2a the greatest play of the handle may be in a vertical plane and orienting the plate 6 at right angles to the position shown in FIG. 1 with increased interference may thus be preferable.

FIG. 2 illustrates a modification (plan view) to slot 5 for ease of assembly of the handle 3 to the saucepan 2. The upper part of slot 5' faces towards the saucepan and the slot is stepped to provide a widened lower portion 5a' extending a substantial length of the slot as shown. Portion 5a' is provided for the insertion of a tool (not shown) having prongs 7 and 8 (or alternatively for a wedge shaped tool) to act on the plate 6 in a direction towards the saucepan to stress the plate until it is substantially flat. Portion 5a' may also receive the legs or teeth 6b of the plate 6. The tool is employed, preferably, as the handle is introduced onto shaft 4.

Instead of the arrangement shown, the retaining plate 6 may initially be of generally flat form (and once again may be employed in either of two orientations at right angles to one another as previously explained in relation to the bowed fix). As the shaft is introduced into the aperture of the flat plate a bow is induced (with or without the aid of the tool as aforesaid) thereby stressing the plate to thereby grip the shaft. In fact, if the handle is assembled in the orientation as shown to restrain the flat plate from falling out of the slot a slight curvature may be formed initially on the edges of the plate. Such a slight curvature is not necessary if the handle is assembled to the saucepan with the saucepan in the upside down position.

The retaining plate could be provided with any convenient number and shape of legs or teeth and may possibly have no legs or teeth. For example, it may be possible for the aperture to be oval with part of the wall defining the aperture providing gripping surfaces by biting into the shaft.

Figure 4:
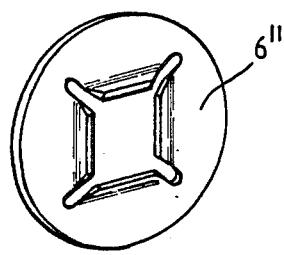

FIGS. 3 and 4 show possible alternative forms of retaining plate 6' and 6".

Figure 5:
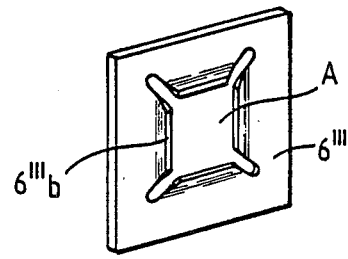
FIG. 5 shows a preferred alternative form for a retaining plate.
Figure 6:
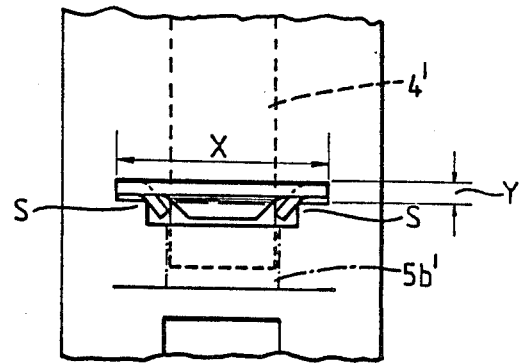
FIG. 6 shows a view similar to FIG. 2 but with the retaining plate of FIG. 5 positioned in the slot arrangement.

FIG. 5 shows yet a further alternative form of retaining plate 6''' with four tapered legs or teeth 6'''b extending inwardly from a generally square aperture A and inclined out of the main plane of the plate 6'''. The main plane of plate 6''' is flat both before and after assembly on the shaft 4' (see FIG. 6) so that there is no induced or pre-formed bowing of the plate in this case, shaft 4' being retained to the handle by deformation of the legs or teeth 6'''b. The relative dimensions of the teeth 6'''b including thickness and radial dimension are believed to be particularly advantageous in producing the required gripping characteristics as shown in the assembled position in FIG. 6. Plate 6''' is attached to shaft 4' of square section and this particular embodiment has been found to be very satisfactory in practice and this design is able to cater for wide tolerances (e.g. 0.02" (0.05 cm) between the shaft dimensions and the matching receiving recess in the handle and yet still retain the handle securely on the shaft 4'. FIG. 6 shows how the lower portion 5a' receives the legs or teeth of the plate 6'''. Surprisingly, and advantageously, the handle 3 may be assembled very easily onto the shaft (at least in the embodiment as shown in FIGS. 5 and 6) without use of a tool and may even be effected purely by hand rather than necessitating application, for example, by means of a pneumatic cylinder. If steps S are omitted then a pronged tool may also be used during assembly of the plate 6''' on shaft 4' to effectively replace the "back-up" function of steps S. This particular saucepan and handle design has been found to meet B.S.I. standard 1859/76 for cast aluminium saucepans and frying pans. Additionally, the length X of the slot 5' may be slightly shorter than the length of the plate 6''' lying parallel with length X in order to provide an advantageous interference fit therebetween. The slot 5' may possibly be provided with a further widened portion 5b' (shown in chain dotted lines) so that the shaft 4' is only bounded on three sides rather than four, in order to ease moulding criteria. The exposed area of the slot 5,5' may be covered with a suitable decorative covering.

Most importantly the aforedescribed principles of retaining a handle (or member) on an article (in particular but not exclusively where the article is subjected to significant temperature changes or vibrations) may be applicable to many fields. In most instances the handle or member will be non-rotatable relative to the article. In particular a similar arrangement may usefully be employed on the saucepan lid to retain the handle (knob handle) to the lid. One example of the way in which the knob may be retained to the lid is shown in FIG. 7.

Figure 7:
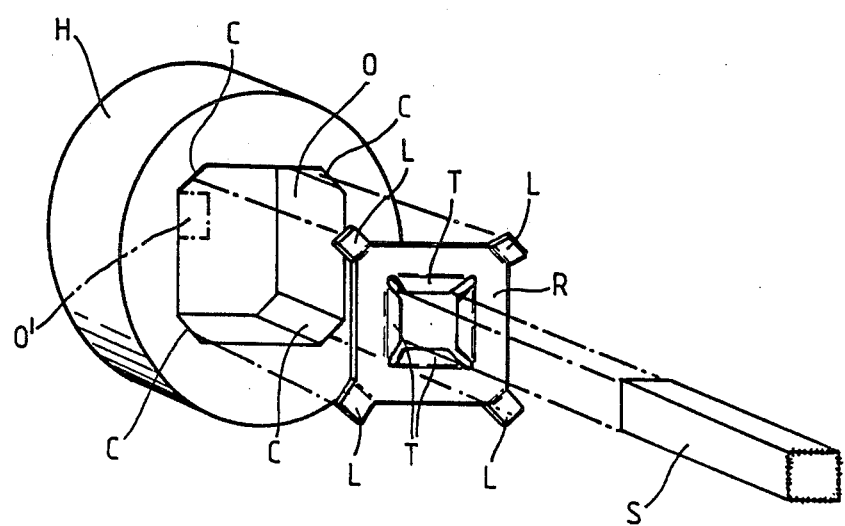
FIG. 7 shows an exploded perspective view which schematically shows the structural arrangement in accordance with the present invention of how a knob handle, for the lid (not shown) of the saucepan, is attached to the lid.

FIG. 7 shows a knob handle H having a relatively large opening O for the reception of a generally square retaining plate R introduced axially into the opening O. The opening O is generally of square cross section but has blunted corners C which co-operate with external legs or teeth L positioned at the corners of the plate R to retain the plate in the opening O by an interference fit. Apart from legs L the plate is of the general form shown in FIG. 5. As shown in FIG. 7 the legs L are initially inclined in a direction away from the opening O (on introduction of the plate R in the opening O) whilst internal legs or teeth T are inclined in a direction towards opening O.

Although the legs L are at the corners of plate R they could, additionally or alternatively, be provided along the sides of the plate.

Plate R is introduced into opening O and then shaft S which has previously been welded onto the top of a saucepan lid (not shown) is introduced axially into the opening O and through the plate R where it is gripped by legs T, in a manner previously described, to hold the knob H on the shaft S and therefore on the lid. A further recess O' maching the cross section of shaft S (shown in dotted lines) may be provided to receive and support the free end of the shaft S. The internal leg configuration of plate R can be altered to suit the particular shaft configuration (i.e. for example to suit round or polygonal cross sections).

It is believed that the present invention may prove highly advantageous and satisfy a long felt want by providing a secure assembly of the handle on the article, particularly in the field of cooking utensils, since, despite many attempts cover a considerable period of time to produce saucepans with handles that do not become loose, a really successful design does not seem to have been forthcoming.

The present invention is, of course, in now way restricted to the specific disclosure of the specification and drawings, but also encompasses any modifications within the scope of the appended claims.

I claim:

1. A method of attaching a separate elongate handle of molded material non-rotatably and completely without any screw fitting on an article which is a cooking utensil, said method in combination comprising steps of:
   (a) permanently fixing a threadless metal shaft onto said article,
   (b) providing said handle with a longitudinal recess for receiving said shaft axially therein as well as including a slot opening therewith located generally at right angles and transversely with respect to the recess axially receiving said shaft therein and opening only in a direction toward the cooking utensil bottom,
   (c) providing a single apertured retaining plate, having integral projections received in a pre-stressed condition within the slot opening of said recess,
   (d) introducing said shaft for permanently fixing thereof into said recess and projecting said shaft transversely through said apertured retaining plate.
   (a) at least temporarily deforming said apertured retaining plate so that said retaining plate grips and bites into said shaft with said projections and thereby solely retains said handle on said article as well as gripping said retaining plate and said shaft under stress to hold said handle together therewith in an interference fit via said projections in a manner which substantially prevents both axial and rotational movement of said handle relative to said shaft, and
   (f) closing-off said recess with said retaining plate as well as handle cover means positioned relative to said recess to block any direct access to said recess as protection against any build-up of any food product contamination therewith.

2. A method as claimed in claim 1 in which said retaining plate has a main plane which is flat both before and after assembly on said shaft.

3. A method as claimed in claim 1 in which said handle is assembled onto said shaft without the use of a tool.

4. A method as claimed in claim 1 in which a pronged tool is used to assemble said handle on said shaft, said tool being introduced into said slot or opening adjacent said retaining plate.

5. An article which is a cooking utensil, comprising:
a threadless metal shaft uniform in cross section and permanently fixed onto said article;
a separate elongate handle of molded material integrally formed with a longitudinal recess for receiving said shaft axially therein as well as including a slot opening therewith located generally at right angles and transversely with respect to the recess axially receiving said shaft therein and opening only in a direction toward the cooking utensil bottom, and
a single apertured retaining plate having integral projections received in a pre-stressed condition within the slot opening of said recess when said shaft is introduced as permanently fixed into the recess upon being introduced to project through said aperture retaining plate;
said retaining plate having a main plane which is flat both before and after assembly on said shaft subject to at least temporary deformation of said retaining plate during assembly so that said retaining plate then grips and bites into said shaft with said projections and thereby solely retains said handle on said article in an interference fit to prevent both axial and rotational movement of said handle relative to said shaft;
said retaining plate being located in said recess in an interfit relationship as well as handle cover means positioned relative to said recess to block any direct access to said recess so that said recess is closed off to make said shaft and said retaining plate generally inaccessible after assembly in order for said recess to be at least protected against any build up of any food product contamination therewith.

6. An article as claimed in claim 5 in which said shaft is square or rectangular and said retaining plate has four legs or teeth, and, preferably, in which the slot or opening is stepped, and, preferably, in which the length of the slot or opening is shorter than the length of the plate lying parallel with said length of the slot or opening to provide an interference fit therebetween, and, preferably, in which the width of the slot or opening is shorter than the width of the plate lying parallel with said thickness of the slot or opening to provide an interference fit therebetween, and, preferably, in which the recess and/or slot/opening is moulded in the handle, and, preferably, in which the shaft extends in a direction parallel to the handle axis, and, preferably in which the article has a widened portion so that the shaft is bounded on three sides and, preferably including a decorative covering over the slot or opening, and, possibly in which said article is a saucepan or other cooking utensil with a handle and, preferably in which the slot or opening opens from the underside (i.e. towards a plane containing the saucepan or utensil bottom) and, preferably, in which the end of the slot or opening opposed to the open end is closed off and, preferably, the article meets B.S.I. standard 1859/76 and, possibly in which the retaining plate has external grip means for example legs or teeth and, possibly in which said article is a saucepan lid and the handle being a knob handle and, possibly in which the grip means are located on corners of the retaining plate.

* * * * *